(12) United States Patent
Adachi

(10) Patent No.: US 8,938,092 B2
(45) Date of Patent: Jan. 20, 2015

(54) IMAGE PROCESSING SYSTEM, IMAGE CAPTURE APPARATUS, IMAGE PROCESSING APPARATUS, CONTROL METHOD THEREFOR, AND PROGRAM

(75) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 13/288,351

(22) Filed: Nov. 3, 2011

(65) Prior Publication Data

US 2012/0114177 A1 May 10, 2012

(30) Foreign Application Priority Data

Nov. 9, 2010 (JP) ................................. 2010-251280

(51) Int. Cl.
G06K 9/00 (2006.01)
(52) U.S. Cl.
CPC ................. *G06K 9/00362* (2013.01)
USPC .......................................... 382/103; 382/100
(58) Field of Classification Search
USPC ................................................. 382/100, 103
See application file for complete search history.

(56) References Cited

U.S. PATENT DOCUMENTS

| | | | | |
|---|---|---|---|---|
| 6,173,066 B1 * | 1/2001 | Peurach et al. | ............... | 382/103 |
| 6,252,972 B1 * | 6/2001 | Linnartz | ....................... | 382/100 |
| 6,363,173 B1 * | 3/2002 | Stentz et al. | ................... | 382/195 |
| 6,477,431 B1 * | 11/2002 | Kalker et al. | ................... | 700/39 |
| 7,369,677 B2 * | 5/2008 | Petrovic et al. | ............... | 382/100 |
| 7,616,776 B2 * | 11/2009 | Petrovic et al. | ............... | 382/100 |
| 7,962,428 B2 * | 6/2011 | Bi et al. | ........................... | 706/20 |
| 8,005,258 B2 * | 8/2011 | Petrovic et al. | ............... | 382/100 |
| 8,015,410 B2 * | 9/2011 | Pelly et al. | ..................... | 713/176 |
| 8,315,835 B2 * | 11/2012 | Tian et al. | ...................... | 702/181 |
| 8,538,066 B2 * | 9/2013 | Petrovic et al. | ............... | 382/100 |
| 8,660,293 B2 * | 2/2014 | Sako et al. | ..................... | 382/100 |
| 8,694,049 B2 * | 4/2014 | Sharma et al. | ............. | 455/550.1 |
| 2005/0129276 A1 * | 6/2005 | Haynes et al. | ................ | 382/103 |
| 2006/0120572 A1 * | 6/2006 | Li et al. | .......................... | 382/118 |
| 2008/0170751 A1 * | 7/2008 | Lei et al. | ........................ | 382/103 |
| 2008/0233980 A1 * | 9/2008 | Englund et al. | ............... | 455/466 |

(Continued)

FOREIGN PATENT DOCUMENTS

| | | |
|---|---|---|
| JP | 07-288802 A | 10/1995 |
| JP | 2007-233495 A | 9/2007 |
| JP | 2008-187328 A | 8/2008 |

OTHER PUBLICATIONS

Gammeter et al ("Server side object recognition and client-side object tracking for mobile augmented reality", IEEE 2010).*

(Continued)

*Primary Examiner* — Avinash J Yentrapati
(74) *Attorney, Agent, or Firm* — Carter, DeLuca, Farrell & Schmidt, LLP

(57) ABSTRACT

There is provided an image processing system in which an image capture apparatus and an image processing apparatus are connected to each other via a network. When a likelihood indicating the probability that a detection target object detected from a captured image is a predetermined type of object does not meet a designated criterion, the image capture apparatus generates tentative object information for the detection target object, and transmits it to the image processing apparatus. The image processing apparatus detects, from detection targets designated by the tentative object information, a detection target as the predetermined type of object.

17 Claims, 10 Drawing Sheets

(56) References Cited

U.S. PATENT DOCUMENTS

| | | | |
|---|---|---|---|
| 2009/0285444 A1* | 11/2009 | Erol et al. | 382/100 |
| 2010/0260426 A1* | 10/2010 | Huang et al. | 382/218 |
| 2012/0274781 A1* | 11/2012 | Shet et al. | 348/169 |
| 2013/0114849 A1* | 5/2013 | Pengelly et al. | 382/103 |

OTHER PUBLICATIONS

"The Current State and Future Directions on Generic Object Recognition", Journal of Information Processing: The Computer Vision and Image Media, vol. 48, No. SIG16 (CVIM19), Nov. 2007.

* cited by examiner

| DETECTED OBJECT | ID | POSITION $(x_1, y_1)$-$(x_2, y_2)$ | HUMAN BODY LIKELIHOOD | HUMAN BODY DETERMINATION | FEATURE AMOUNT |
|---|---|---|---|---|---|
| OBJECT A | 0001 | (200,150)-(400,650) | 90.0 | ○ | 810 |
| OBJECT B | 0002 | (600,100)-(700,300) | 70.0 | △ | 510 |
| OBJECT C | 0003 | (550,500)-(700,600) | 20.0 | × | 310 |

FIG. 10A

| INTEGRATED OBJECT INFORMATION | | |
|---|---|---|
| SPECIFIED OBJECT INFORMATION | | |
| | OBJECT ID | 0001 |
| | OBJECT REGION | (200,150)–(400,650) |
| TENTATIVE OBJECT INFORMATION | | |
| | OBJECT ID | 0002 |
| | OBJECT REGION | (600,100)–(700,300) |
| | FEATURE AMOUNT | 510 |
| | HUMAN BODY LIKELIHOOD | 70.0 |

FIG. 10B

| INTEGRATED OBJECT INFORMATION | | |
|---|---|---|
| OBJECT ID | | 0001 |
| | OBJECT REGION | (200,150)–(400,650) |
| | FEATURE AMOUNT | 810 |
| | HUMAN BODY LIKELIHOOD | ○ |
| OBJECT ID | | 0002 |
| | OBJECT REGION | (600,100)–(700,300) |
| | FEATURE AMOUNT | 510 |
| | HUMAN BODY LIKELIHOOD | △ |
| OBJECT ID | | 0003 |
| | OBJECT REGION | (550,500)–(700,600) |
| | FEATURE AMOUNT | 310 |
| | HUMAN BODY LIKELIHOOD | × |

FIG. 11A

| INTEGRATED OBJECT INFORMATION | | |
|---|---|---|
| SPECIFIED OBJECT INFORMATION | | |
| | OBJECT ID | 0001 |
| | OBJECT REGION | (200,150)-(400,650) |
| TENTATIVE OBJECT INFORMATION | | |
| | OBJECT ID | 0002 |
| | OBJECT REGION | (600,100)-(700,300) |

FIG. 11B

| INTEGRATED OBJECT INFORMATION | | |
|---|---|---|
| SPECIFIED OBJECT INFORMATION | | |
| | OBJECT ID | 0001 |
| | OBJECT REGION | (200,150)-(400,650) |
| TENTATIVE OBJECT INFORMATION | | |
| | OBJECT ID | 0002 |
| | OBJECT REGION | (600,100)-(700,300) |
| | OBJECT IMAGE | ...(binary data) |

IMAGE PROCESSING SYSTEM, IMAGE CAPTURE APPARATUS, IMAGE PROCESSING APPARATUS, CONTROL METHOD THEREFOR, AND PROGRAM

BACKGROUND OF THE INVENTION

1. Field of the Invention

The present invention relates to an image processing system in which an image capture apparatus and an image processing apparatus are connected to each other via a network.

2. Description of the Related Art

Conventionally, there is known a technique for detecting an object in an image captured by an image capture apparatus such as a network camera by analyzing the image.

As an example of such a technique, there is a method of detecting whether a human body region or face region exists in an image. In this method, a feature amount such as a feature vector is detected from an input image, and comparison processing is performed using a recognition dictionary which holds the feature amount of a detection target object such as a human body or face. Then, a likelihood also called a similarity or evaluation value is detected as a result of the comparison processing, thereby detecting the detection target object. In this method, if the likelihood is greater than or equal to a predetermined threshold value, it is determined that the detection target object has been detected. If the detection target object is detected, it is possible to transmit the detected object to another apparatus on a network as a detection event, and the other apparatus can use the object.

As another example of a method of detecting an object in an image, there is known a method of expressing the positional relationship between local regions by a probability model, and recognizing a human face or vehicle by learning (e.g., see "The Current State and Future Forecast of General Object Recognition", Journal of Information Processing: The Computer Vision and Image Media, Vol. 48, No. SIG16 (CVIM19)).

It has been also proposed to apply a technique for detecting an object from an image to a system such as a monitoring apparatus. There has been proposed, for example, a technique for transmitting detected event information to a monitoring apparatus via a network together with an image upon detecting an object (see, for example, Japanese Patent Laid-Open No. 7-288802).

Furthermore, there has been conventionally proposed a technique for executing detection processing on the terminal side in accordance with the stop/non-stop state of mobile object detection in a camera (see, for example, Japanese Patent Laid-Open No. 2008-187328).

There is conventionally known a distributed image processing apparatus which has the first image processing apparatus for performing processing using a captured image and the second image processing apparatus for performing detailed processing for a stored image based on an index created by the first image processing apparatus. In this distributed image processing apparatus, the first image processing apparatus creates an index such as an intrusion object detection result or vehicle number recognition processing result. The second image processing apparatus extracts the feature amount of an image for only an image frame to undergo the detailed processing (e.g., see Japanese Patent Laid-Open No. 2007-233495).

Unlike a general-purpose personal computer or server, however, the throughput of a camera is low due to general restrictions on hardware resources such as a CPU and memory. It may be difficult to perform real time processing when a low-throughput camera performs a detection operation with a high processing load such as a human body detection operation, or processes a high-resolution image. Furthermore, in a detection method in which comparison is made using a recognition dictionary, such as pattern recognition, a detection operation may not be performed with high accuracy due to a limited capacity of the recognition dictionary of detection target objects.

On the other hand, assume that a server such as an image processing server receives a captured image or its metadata from a camera to execute detection processing. In this case, if the number of connected cameras increases, the server may no longer be able to handle the processing since the load is concentrated on it.

SUMMARY OF THE INVENTION

The present invention provides a technique for improving the accuracy of object detection in an image processing system for detecting an object, which includes network cameras and an image processing apparatus connected via a network.

To achieve the above object, the present invention provides an image processing system in which an image capture apparatus and an image processing apparatus are connected to each other via a network, comprising: the image capture apparatus comprises an image capture unit configured to capture an image, a likelihood detection unit configured to detect a likelihood indicating a probability that a detection target object detected from the image captured by the image capture unit is a predetermined type of object, a first object detection unit configured to generate, when the likelihood detected by the likelihood detection unit does not meet a designated criterion, tentative object information for the detection target object, and a transmission unit configured to transmit the tentative object information to the image processing apparatus via the network, and the image processing apparatus comprises a reception unit configured to receive the tentative object information, and a second object detection unit configured to detect a detection target as the predetermined type of object from detection targets designated by the tentative object information.

According to the present invention, it is possible to improve the accuracy of object detection in an image processing system for detecting an object, which includes network cameras and an image processing apparatus connected via a network.

Further features of the present invention will become apparent from the following description of exemplary embodiments with reference to the attached drawings.

BRIEF DESCRIPTION OF THE DRAWINGS

FIG. 10A is a view showing the data structure of object information according to the first embodiment;

FIG. 10B is a view showing a data structure example of object information when the object information contains a likelihood;

FIG. 11A is a view showing the data structure of object information according to the second embodiment; and FIG. 11B is a view showing a data structure example of object information when the object information contains image data corresponding to an object region.

DESCRIPTION OF THE EMBODIMENTS

Preferred embodiments of the present invention will be described in detail below with reference to the accompanying drawings. Note that configurations shown in the following embodiments are merely examples and the present invention is not limited to them.

First Embodiment

In the first embodiment, a network camera compares the feature amount of captured image data with that in a recognition dictionary, executes object detection processing to detect the likelihood of a detection target object such as a human body, and transmits the detection result and the feature amount to an image processing apparatus according to the detected likelihood. Upon receiving the detection result and feature amount, the image processing apparatus executes object redetection processing using the feature amount.

Figure 1:
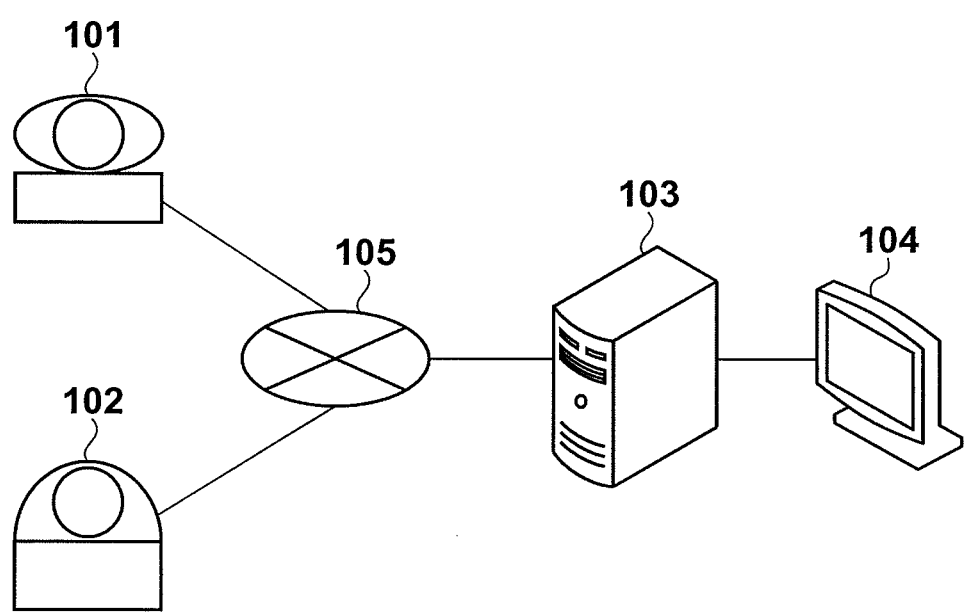
FIG. 1 is a view showing the overall configuration of an image processing system according to the first embodiment.

FIG. 1 is a view showing the overall configuration of an image processing system according to the first embodiment.

Referring to FIG. 1, network cameras 101 and 102, an image processing apparatus 103, and a display apparatus 104 are connected to each other via a network 105. A dedicated network or the Internet may be used as the network 105.

The network camera 101 or 102 transmits a captured image and detection result to the image processing apparatus 103. Note that the detection result includes detected object information, information indicating whether the detected object is a designated predetermined type of object such as a human body or face, and data such as a likelihood and feature amount to be used for detection processing.

The image processing apparatus 103 serves as an information processing apparatus such as a PC (Personal Computer). The image processing apparatus 103 receives image data and a detection result from the network camera 101 or 102, and outputs, to the display apparatus 104, the received image data and detection result or the detection result of object redetection processing.

Figure 2:
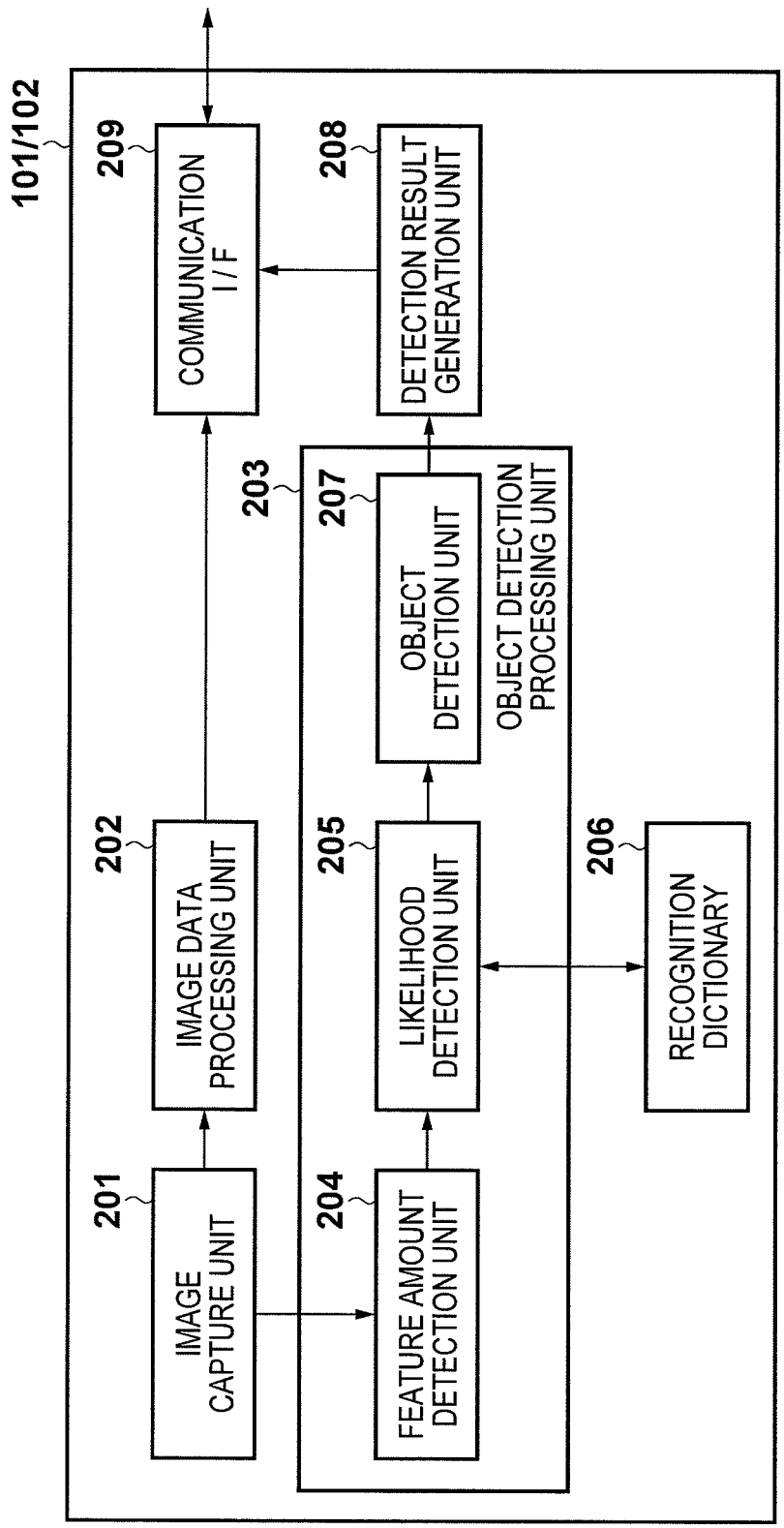
FIG. 2 is a block diagram showing the internal arrangement of a network camera according to the first embodiment.

FIG. 2 is a block diagram showing the internal arrangement of the network camera according to the first embodiment.

Referring to FIG. 2, an image capture unit 201 includes a lens and image sensor. The image capture unit 201 transmits captured image data to a feature amount detection unit 204 and an image data processing unit 202. The image data processing unit 202 encodes the image data. A method such as JPEG, MPEG2, MPEG4, or H.264 is used as an encoding method. The unit 202 transmits the encoded image data to the image processing apparatus 103 via a communication interface (I/F) 209 using a communication method such as HTTP or RTP.

An object detection processing unit 203 includes the feature amount detection unit 204, a likelihood detection unit 205, and an object detection unit 207. The feature amount detection unit 204 detects the feature amount of the image data. The feature amount represents the features of an image, and is used for internal processing in detecting a human body likelihood (to be described later). The likelihood detection unit 205 uses a feature amount registered in a recognition dictionary 206 to detect a likelihood indicating the probability that a detection target object is a designated predetermined type of object. The likelihood detection unit 205 may generate an index for the detection target object based on the detected likelihood. The index includes the first index indicating that the detection target object is the designated predetermined type of object, the second index indicating that whether the detection target object is the designated predetermined type of object is uncertain, and the third index indicating that the detection target object is not the designated predetermined type of object.

The recognition dictionary 206 holds the feature amount of a general human body which has been registered in advance. The feature amount of the human body includes information indicating a head shape, and the relative position and high/low degree of shoulders with respect to a head, and information indicating the features of a human body.

In the first embodiment, the likelihood detection unit 205 compares a feature amount held in the recognition dictionary 206 with that of an input image, and then detects the position and likelihood of a human body in the input image based on the comparison result. The human body likelihood represents the probability that a detected object is a human body, and ranges from 0 to 100. As the human body likelihood is closer to 100, the detected object is more likely a human body. As the likelihood is closer to 0, the detected object is less likely a human body.

Note that although a detection target object is a human body in the first embodiment, the detection target object may be a face or another object. By holding the feature amount of a detection target object other than a human body in the recognition dictionary 206 in advance, it is also possible to detect an object other than a human body and the likelihood of the object.

The object detection unit 207 detects a detection target object by comparing the human body likelihood detected by the likelihood detection unit 205 with a predetermined threshold value.

Based on the detection result of the object detection unit 207, a detection result generation unit 208 generates integrated object information, and then outputs it as a detection result. The object information includes specified object information for an object which has been specified as a human body, and object information (tentative object information) which does not meet a predetermined criterion. The specified object information is obtained when the likelihood of a detection target object is greater than or equal to a predetermined first threshold value and the detection target object is specified as a detected object. That is, in this example, the information indicates that the detection target object is a human body. On the other hand, the object information (tentative object information) which does not meet the predetermined criterion refers to object related information necessary for executing object redetection processing on the image processing apparatus 103 side. The object related information includes a feature amount (and a likelihood) and object region information (region data indicating the position of an object region, partial image data corresponding to the object region, and the like).

The communication interface (I/F) 209 transmits the encoded image data from the image data processing unit 202 and the detection result of the detection result generation unit 208.

A detection example of specified object information and tentative object information will now be explained with reference to FIGS. 8 and 9.

Figures 8, 9:
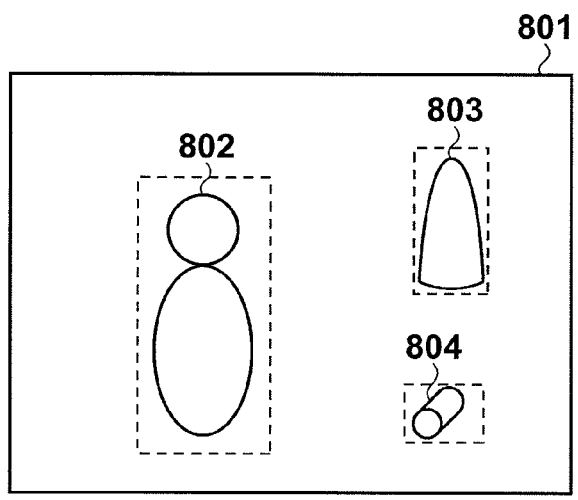
FIG. 8 is a view for explaining a detection example of specified object information and tentative object information according to the first embodiment.
FIG. 9 is a table for explaining a detection example of specified object information and tentative object information according to the first embodiment.

Referring to FIG. 8, a captured image 801 contains objects A (802), B (803), and C (804). Using the feature amount detection unit 204, likelihood detection unit 205, and recognition dictionary 206, an ID, position (bounding rectangle), human body likelihood, human body determination result, and feature amount are calculated for each of objects A, B, and C, as shown in a table of FIG. 9.

As predetermined threshold values, a threshold value a is set to 80.0 and a threshold value b is set to 50.0. Since object A has a likelihood greater than or equal to the first threshold value (threshold value a), it is determined as a human body (the human body determination result: ○). Since object B has a likelihood which is greater than or equal to the second threshold value (threshold value b) and is less than the first threshold value (threshold value a), it is determined as an object which is likely a human body (the human body determination result: Δ). Since object C has a likelihood smaller than the second threshold value (threshold value b), it is determined not to be a human body (the human body determination result: x).

Figure 3:
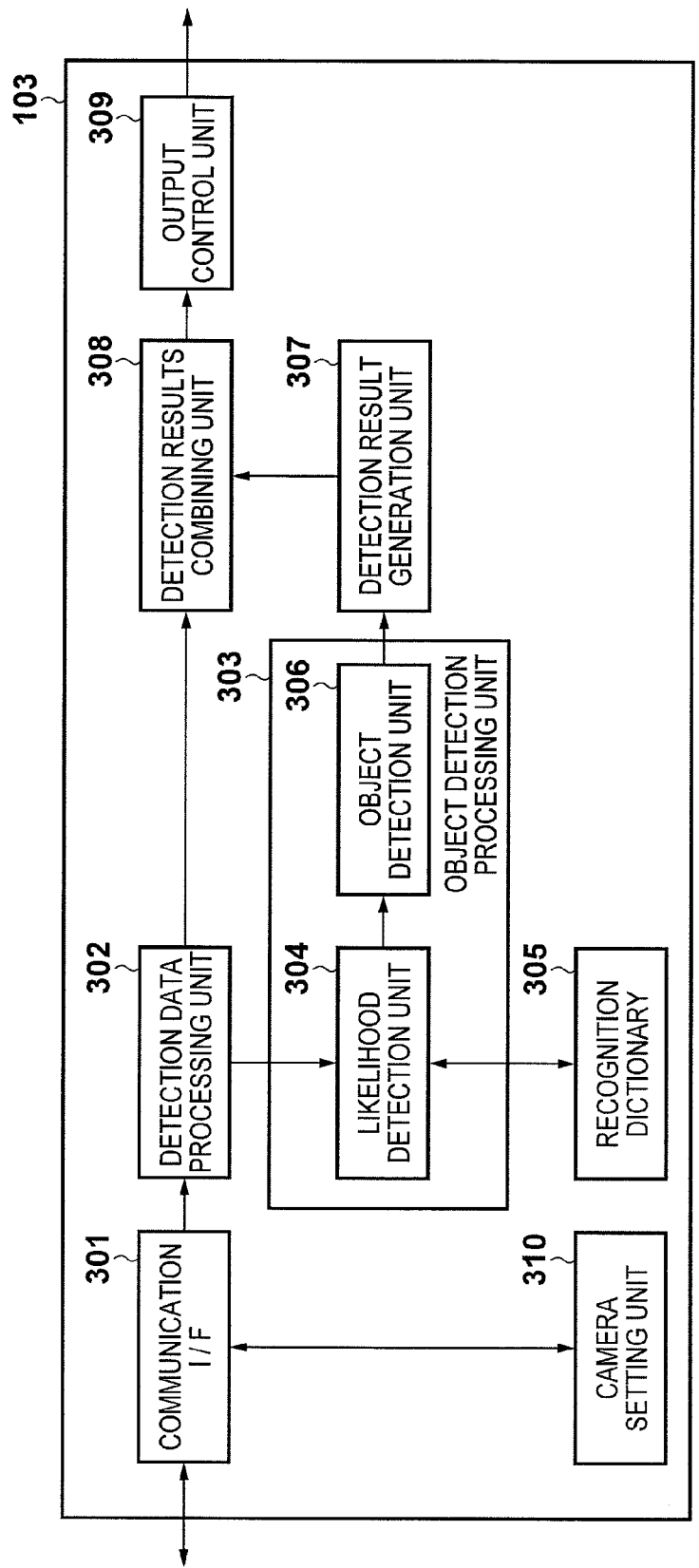
FIG. 3 is a block diagram showing the internal arrangement of an image processing apparatus according to the first embodiment.

FIG. 3 is a block diagram showing the internal arrangement of the image processing apparatus according to the first embodiment.

Referring to FIG. 3, a communication interface (I/F) 301 receives a detection result containing integrated object information from the network 105. A detection data processing unit 302 transmits specified object information of the integrated object information contained in the detection result to a detection results combining unit 308, and transmits tentative object information of the integrated object information to a likelihood detection unit 304. Reference numeral 303 denotes an object detection processing unit which includes the likelihood detection unit 304 and an object detection unit 306.

Assume that the likelihood detection unit 205 and object detection unit 207 of the network camera 101 or 102 serve as the first likelihood detection unit and the first object detection unit, respectively. In this case, the likelihood detection unit 304 and object detection unit 306 of the image processing apparatus 103 serve as the second likelihood detection unit and the second object detection unit, respectively.

The likelihood detection unit 304 detects the likelihood of a detection target object using feature amounts registered in a recognition dictionary 305. The recognition dictionary 305 has a large recording capacity and therefore holds a large number of feature amounts, as compared with the recognition dictionary 206 of the network camera 101 or 102, thereby enabling object detection with higher accuracy. A large number of feature amounts include, for example, the feature amounts of a human body in multiple directions, and will be described in detail later. Based on the likelihood detected by the likelihood detection unit 304, the object detection unit 306 performs processing for specifying the detection target object as a detected object. In this way, the object detection unit 306 executes object detection processing again (object redetection processing) for the detection target object for which the network camera 101 or 102 has executed object detection processing.

Assume that the recognition dictionary 206 of the network camera 101 or 102 serves as the first recognition dictionary. In this case, the recognition dictionary 305 of the image processing apparatus 103 serves as the second recognition dictionary.

A detection result generation unit 307 generates object information, and outputs it as a detection result. The detection results combining unit 308 combines a detection result obtained by detecting an object as a human body on the network camera 101 or 102 side with a detection result obtained by detecting an object as a human body on the image processing apparatus 103 side. In this combining processing, among detection results obtained by executing object detection processing in each of the network camera 101 or 102 and the image processing apparatus 103, only detection results obtained by specifying objects as human bodies are combined. With this processing, a detection result of object (human body) detection containing only objects specified as human bodies is output.

An output control unit 309 outputs the detection result of the detection results combining unit 308. A camera setting unit 310 makes various settings such as an object detection threshold value in the network camera 101 or 102 via the network 105.

In the first embodiment, the threshold value set in the network camera 101 or 102 is a predetermined threshold value. However, the threshold value may be changed in accordance with the performance of the CPU, network band, and the like of the image processing apparatus 103 in communication on the network 105. This allows a network camera connected to a high-throughput image processing apparatus to save the processing power on the network camera side by widening the range of a detection threshold value for determining an object as a likely human body in human body detection processing, and assigning object redetection processing to the image processing apparatus. On the other hand, when a network camera is connected to a low-throughput image processing apparatus, it is possible to assign more processes to the network camera side as compared with the image processing apparatus side by narrowing the range of a detection threshold value for determining an object as a likely human body.

Figure 4:
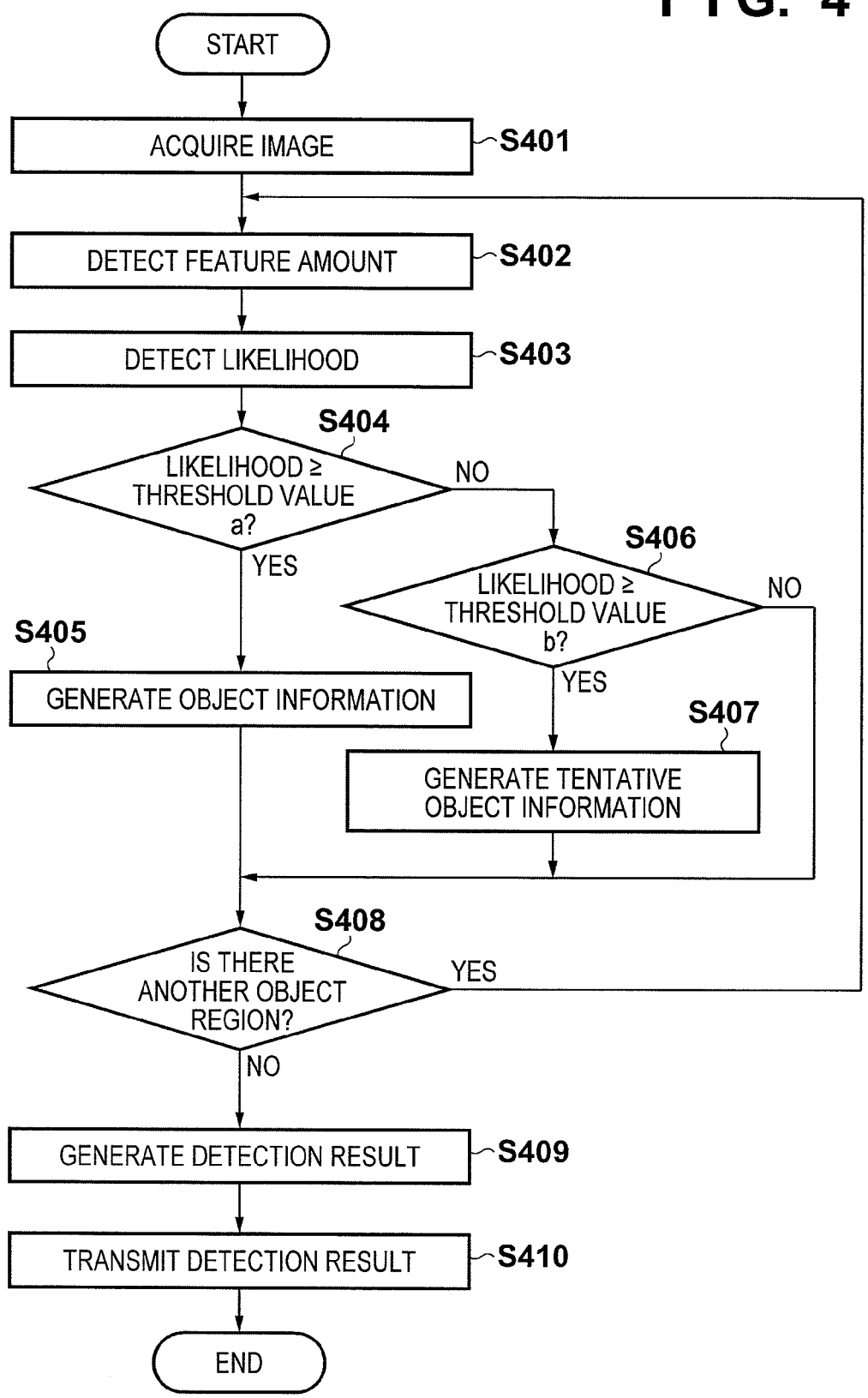
FIG. 4 is a flowchart illustrating a processing procedure of the network camera according to the first embodiment.

FIG. 4 is a flowchart illustrating a processing procedure of the network camera according to the first embodiment. When the network camera has a processor and memory, the processing flow of FIG. 4 indicates a program for causing the processor to execute the procedure shown in FIG. 4. The processor of the network camera serves as a computer, which executes a program read out from the memory of the network camera. The memory of the network camera is a recording medium which records a program so that the processor can read out the program.

In step S401, each of the image data processing unit 202 and feature amount detection unit 204 acquires image data input from the image capture unit 201. The image data processing unit 202 performs encoding processing as image processing for the acquired image data. In step S402, the feature amount detection unit 204 detects the feature amount of a selected one of (a group of) object regions obtained from the input image data.

In step S403, the likelihood detection unit 205 compares the detected feature amount with that in the recognition dictionary 206, and detects, from the image data, an object region which is estimated as a human body region and the likelihood which indicates the probability that the object region is a human body. Note that by registering the feature amount of a face in the recognition dictionary 206 in addition to the feature amount of a human body, the likelihood detection unit 205 may detect, in step S403, the likelihood that a detected object is a face. In this way, it is also possible to detect an arbitrary type of object by switching the recognition dictionary 206 to a recognition dictionary corresponding to a type (a human body, a face, or the like) of detection target object or sharing the recognition dictionary 206. Note that by adding feature amounts such as sex, age, and dress in the recognition dictionary 206, it may be possible to perform more detailed human body detection processing.

In step S404, the object detection unit 207 classifies the likelihood detected in step S403 based on the first threshold value a (80.0). If the unit 207 determines that the likelihood is greater than or equal to the first threshold value a (YES in step S404), it detects the object region of the image as specified object information (a human body). In step S405, the object detection unit 207 generates object information (human body information) of the object detected as a human body. The human body information contains an object ID, an object region, its position, a human body determination result, and a feature amount. If it is possible to obtain sex, age, dress and the like by increasing the number of types of feature amounts in the recognition dictionary 206, these data items may be added to the human body information.

Alternatively, if the object detection unit 207 determines that the likelihood is smaller than the first threshold value a (NO in step S404), it classifies, in step S406, the likelihood detected in step S403 based on the second threshold value b (50.0). If the unit 207 determines that the likelihood is smaller than the second threshold value b (NO in step S406), it executes processing in step S408 (to be described later); otherwise (YES in step S406), it detects the object region of the image as object information which does not meet a predetermined criterion. The second threshold value b is set smaller than the first threshold value a. If the object detection unit 207 determines that the likelihood is greater than or equal to the second threshold value b (YES in step S406), it generates tentative object information associated with the object region in step S407. The tentative object information refers to object related information necessary for the apparatus (image processing apparatus 103), which has received data in the network, to execute object redetection processing. The object related information may contain a feature amount (and a likelihood) and object region information (e.g., region data indicating the position of an object region and partial image data corresponding to the object region).

If the processing in step S405 or S407 is executed, or if NO is determined in step S406, the object detection processing unit 203 determines in step S408 whether there is a next object region to be detected in the image. If there is a next object region (YES in step S408), the object detection processing unit 203 selects the next object region to be processed, and returns the process to step S402 to detect the feature amount of the selected object region. If there is no next object region (NO in step S408), the object detection processing unit 203 advances the process to step S409.

In step S409, the detection result generation unit 208 generates, as a detection result, object information (integrated object information) by integrating specified object information (human body information of objects specified as human bodies) and tentative object information containing a plurality of pieces of information of object regions determined as likely human body regions. That is, the integrated object information contains specified object information obtained by determining, as a human body region, an object region whose likelihood is greater than or equal to the first threshold value a, and tentative object information obtained by determining that whether an object region whose likelihood is greater than or equal to the second threshold value b and is less than the first threshold value a is a human body is uncertain.

With reference to FIGS. 8 and 9, since object A has a human body likelihood larger than the first threshold value a, specified object information is obtained. For object A, specified object information which contains the position of a human body region, a human body likelihood of 90.0, a human body determination result (a first index "○" indicating that the object is a human body), and a feature amount of 810 is generated. The position of the object region (human body region) is obtained by an equation: the upper left point coordinates (x1, y1)–the lower right point coordinates (x2, y2)=(200, 150)–(400, 650) for defining the region of object A in FIG. 8.

Since object B has a human body likelihood which is greater than or equal to the second threshold value b and is less than the first threshold value a, and it is thus uncertain whether object B is a human body, tentative object information is obtained. For object B, tentative object information which contains the position of a human body region, a human body likelihood of 70.0, a human body determination result (a second index "Δ" indicating that it is uncertain whether the object is a human body), and a feature amount of 510 is generated. The position of the object region is obtained by an equation: the upper left point coordinates (x1, y1)–the lower right point coordinates (x2, y2)=(600, 100)–(700, 300) for defining the region of object B in FIG. 8.

Since object C has a human body likelihood smaller than the second threshold value b, it is determined that the object is not a human body and thus neither object information nor object related information is generated. Note that it is possible to generate object information. In this case, for object C, object information which contains the position of a human body region, a human body likelihood of 20.0, a human body determination result (a third index "x" indicating that the object is not a human body), and a feature amount of 310 is generated. The position of the object region is obtained by an equation: the upper left point coordinates (x1, y1)–the lower right point coordinates (x2, y2)=(550, 500)–(700, 600) for defining the region of object C in FIG. 8.

FIG. 10A shows the data structure of object information according to the first embodiment. As shown in FIG. 10A, specified object information and tentative object information as object information have different managed data items. In the specified object information, "object ID" and "object region" are managed as data items. In the tentative object information, in addition to "object ID" and "object region", "feature amount" and "human body likelihood" are managed as data items. Note that "human body likelihood" is not essential and thus need not be managed to decrease the data amount.

In the first embodiment, a bounding rectangle is used as a region for specifying an object region in an image. However, any data such as a polygon, a curve, or corresponding pixels may be used as long as it is possible to determine the position of an object region.

In step S410 of FIG. 4, the detection result (integrated object information) generated in step S409 and the image data generated by the image data processing unit 202 are transmitted to the network 105 via the communication interface 209.

Figure 5:
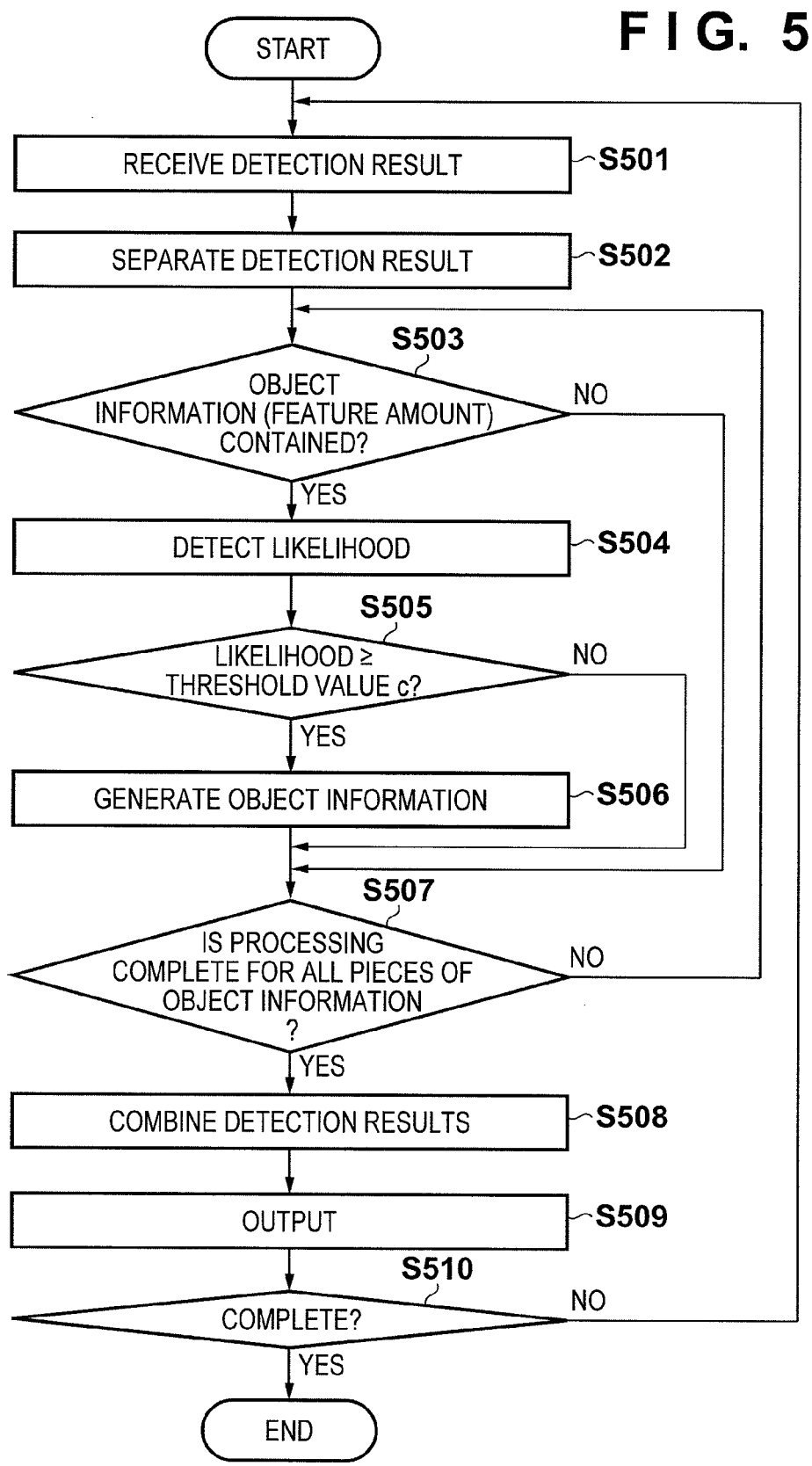
FIG. 5 is a flowchart illustrating a processing procedure of the image processing apparatus according to the first embodiment.

FIG. 5 is a flowchart illustrating a processing procedure of the image processing apparatus 103 according to the first embodiment. When the image processing apparatus 103 includes a processor and memory, the processing flow of FIG. 5 indicates a program for causing the processor to execute the procedure shown in FIG. 5. The processor of the image processing apparatus 103 serves as a computer, which executes a program read out from the memory of the image processing apparatus 103. The memory of the image processing apparatus 103 is a recording medium which records a program so that the processor can read out the program.

Referring to FIG. 5, in step S501, the image processing apparatus 103 receives the detection result (integrated object information and image data) from the network 105 via the communication interface 301. The image data contained in the detection result may or may not be output via the output control unit 309 depending on a use or purpose. In step S502, the detection data processing unit 302 performs separation processing for the integrated object information contained in the detection result. In the separation processing, the integrated object information is separated into specified object information and tentative object information. After the separation processing, the detection data processing unit 302 transmits the specified object information to the detection results combining unit 308, and transmits the tentative object information to the likelihood detection unit 304.

In step S503, the detection data processing unit 302 selects one piece of object information or one of a plurality of pieces of object information (specified object information or tentative object information) contained in the integrated object information, and determines whether the selected object information contains a feature amount. If it is determined that the object information contains no feature amount (NO in step S503), the object information is specified object information and thus the detection data processing unit 302 transmits the object information to the detection results combining unit 308; otherwise (YES in step S503), the object information is tentative object information and thus the process advances to step S504.

In step S504, the likelihood detection unit 304 compares the feature amount contained in the tentative object information with that in the recognition dictionary 305 to detect the likelihood of the object region. The recognition dictionary 305 has a recording capacity larger than that of the recognition dictionary 206 of the network camera 101 or 102, and holds many feature amounts, thereby enabling object detection with higher accuracy.

More specifically, the recognition dictionary 206 of the network camera 101 or 102 holds the feature amount of a human body when capturing an image from the front direction (a predetermined direction with respect to the reference plane of the human body). On the other hand, the recognition dictionary 305 of the image processing apparatus 103 holds the feature amounts of a human body when capturing an image from multiple directions such as a side, the back, and diagonally above (a plurality of different directions with respect to the reference plane of the human body).

This allows the image processing apparatus 103 to detect a human body with higher accuracy. The same goes for a case in which the recognition dictionary 305 holds the feature amount of a face. Even if it is possible to detect only a face seen from the front direction by executing the object detection processing by the network camera 101 or 102, the image processing apparatus 103 can detect the face seen from directions other than the front direction.

The recognition dictionary 206 of the network camera 101 or 102 may hold the feature amount of the face of a specific person, and the recognition dictionary 305 of the image processing apparatus 103 may hold the feature amounts of the faces of a plurality of persons.

Assume that the object information contains a likelihood. In this case, only if the likelihood is greater than or equal to a predetermined value, likelihood detection processing may be executed for the object information in step S504. This makes it possible to reduce the load of the image processing apparatus and improve the processing speed by setting a predetermined value in accordance with the detection accuracy and throughput of the image processing apparatus 103.

FIG. 10B shows a data structure example of object information when the object information contains a likelihood. Referring to FIG. 10B, object information contains a human body likelihood as well as an object ID, its object region, and a feature amount. As shown in FIG. 10B, it is possible to configure object information by adding a likelihood for each detected object without discriminating between specified object information and tentative object information unlike the structure shown in FIG. 10A. Note that the likelihood indicates the probability that a corresponding object is a human body by not a numerical value but a three-level index (○, Δ, x). As described above, a numerical value need not be used. Any type of index may be used as long as the index indicates a likelihood.

In step S505, the object detection unit 306 classifies the likelihood detected in step S504 based on the predetermined threshold value c (the third threshold value). If the unit 306 determines that the likelihood is smaller than the threshold value c (the third threshold value) (NO in step S505), it determines that an object represented by the object information to be processed is not a human body, discards the object information, and then advances the process to step S507. Alternatively, if the unit 306 determines that the likelihood is greater than or equal to the threshold value c (the third threshold value) (YES in step S505), the detection result generation unit 307 generates object information as human body object information (specified object information) in step S506.

Note that the third threshold value c may be equal to the first threshold value a, or in order to have a tolerance to some extent, the third threshold value c may be set so as to meet the second threshold value b<<the third threshold value c<the first threshold value a (the third threshold value is greater than the second threshold value and less than or equal to the first threshold value). In any cases, the third threshold value can be set depending on a use or purpose.

In step S507, it is determined whether the processing is complete for all the pieces of object information contained in the integrated object information. If the processing is not complete (NO in step S507), the next object information to be processed is selected and the process returns to step S503 to determine whether a feature amount exists in the object information. If the processing is complete (YES in step S507), the process advances to step S508.

In step S508, the detection results combining unit 308 combines the detection result (specified object information) obtained by detecting an object as a human body by the network camera 101 or 102 with the detection result (specified object information) obtained by detecting an object as a human body by the image processing apparatus 103. In step S509, the output control unit 309 outputs the thus obtained detection result. In step S510, it is determined whether the processing is complete for all the pieces of object information in the image received from each network camera. If the processing is not complete (NO in step S510), the process returns to step S501 to process the next image; otherwise (YES in step S510), the process ends.

As described above, according to the first embodiment, a network camera detects the feature amount and likelihood of a detection target object. The network camera transmits, to an image processing apparatus, as a detection result, tentative object information containing a feature amount as intermediate processing data for a detection target object whose likelihood falls within the range of a predetermined threshold value together with specified object information. Upon receiving the detection result containing the object information from a network, the image processing apparatus executes object redetection processing using the object information containing the feature amount. This makes it possible to execute object detection processing for a detection target object with high accuracy while distributing the load of the detection processing among the network camera and image processing apparatus.

Second Embodiment

In the second embodiment, as an object detection processing, a network camera detects only an object region without detecting a likelihood or feature amount. The network camera transmits, as a detection result, image data and object information containing only object region information (region data indicating the position of an object region) to an image processing apparatus. The image processing apparatus executes object detection processing to detect final object information by detecting the necessary likelihood and feature amount of image data corresponding to the object region from the received image data and object information. The arrangement of the second embodiment is effective especially when the throughput of the network camera is low.

In the second embodiment, the arrangement is the same as that in the first embodiment and a description thereof will be omitted. Different parts will be mainly described.

In the second embodiment, the network camera has the arrangement shown in FIG. 2. Referring to FIG. 2, an image data processing unit 202 encodes captured image data, and transmits the encoded data via a communication interface 209. In the second embodiment, the unit 202 encodes the whole captured image data, and then transmits the encoded data.

A detection result generation unit 208 generates integrated object information. The integrated object information of the second embodiment refers to object related information necessary for an image processing apparatus 103, which receives data via a network, to execute object detection processing, and more particularly, specified object information and tentative object information each contain "object ID" and "object region". Unlike the tentative object information contained in the integrated object information shown in FIGS. 10A and 10B of the first embodiment, the object information does not contain a feature amount or human body likelihood.

FIG. 11A is a view showing the data structure of the object information of the second embodiment. Referring to FIG. 11A, there are specified object information and tentative object information as object information. In the second embodiment, the object information and image data are transmitted to the image processing apparatus 103 side.

Figure 6:
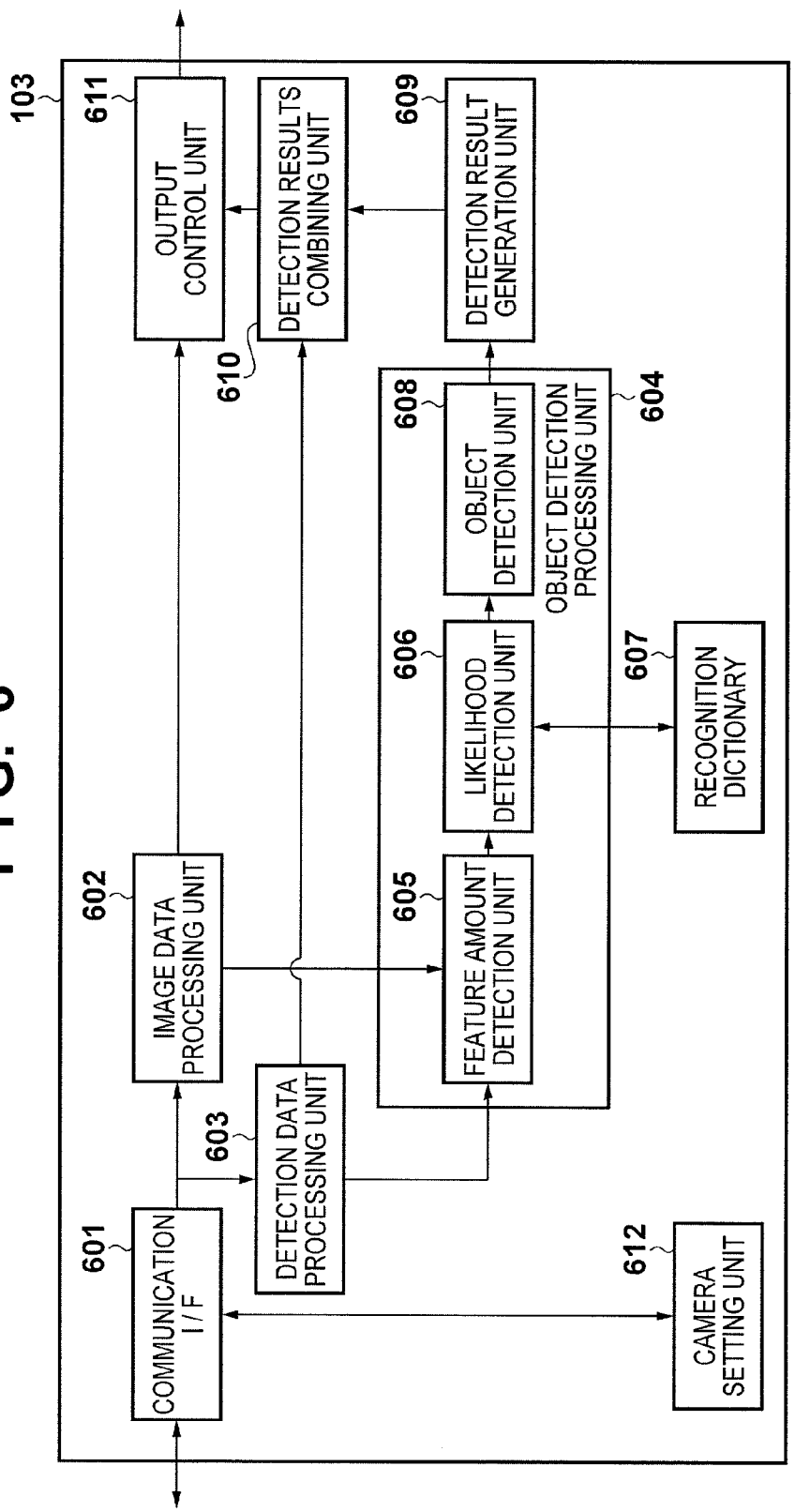
FIG. 6 is a block diagram showing the internal arrangement of an image processing apparatus according to the second embodiment.

FIG. 6 is a block diagram showing the internal arrangement of the image processing apparatus 103 according to the second embodiment.

Referring to FIG. 6, a communication interface (I/F) 601 receives a detection result containing object information from a network 105. An image data processing unit 602 transmits specified object information of the object information contained in the detection result to a detection results combining unit 610, and transmits tentative object information of the object information to a feature amount detection unit 605.

The image data processing unit 602 decodes the received encoded image data. In response to a request from an object detection processing unit 604, the unit 602 also extracts partial image data corresponding to an object region from the image data, and provides it to the feature amount detection unit 605.

The object detection processing unit 604 includes the feature amount detection unit 605, a likelihood detection unit 606, and an object detection unit 608. The feature amount detection unit 605 detects the feature amount of the image data. The likelihood detection unit 606 detects the likelihood of a detection target object using a feature amount registered in a recognition dictionary 607. The likelihood detection unit 606 may generate an index for the detection target object based on the likelihood. The index includes a first index indicating that the detection target object is a designated predetermined type of object, a second index indicating that whether the detection target object is the designated predetermined type of object is uncertain, and a third index indicating that the detection target object is not the designated predetermined type of object.

The recognition dictionary 607 holds the feature amount of a general human body which has been registered in advance. The object detection unit 608 compares the human body likelihood detected by the likelihood detection unit 606 with a predetermined threshold value to detect a detection target object. A detection result generation unit 609 generates specified object information. The specified object information refers to information indicating that the likelihood of a detection target object is greater than or equal to a predetermined first threshold value and thus the detection target object is specified as a detected object. That is, the specified object information indicates that the detection target object is a human body.

The detection results combining unit 610 combines a detection result obtained by detecting an object as a human body on a network camera 101 or 102 side with a detection result obtained by detecting an object as a human body on the image processing apparatus side. In this combining processing, among detection results obtained by executing object detection processing in each of the network camera 101 or 102 and the image processing apparatus 103, only detection results obtained by specifying objects as human bodies are combined. With this processing, a detection result of object (human body) detection containing only objects specified as human bodies is output.

An output control unit 611 outputs the detection result of the detection results combining unit 610 and the image data. A camera setting unit 612 makes settings such as an object detection threshold value in the network camera 101 or 102 via the network 105.

Figure 7:
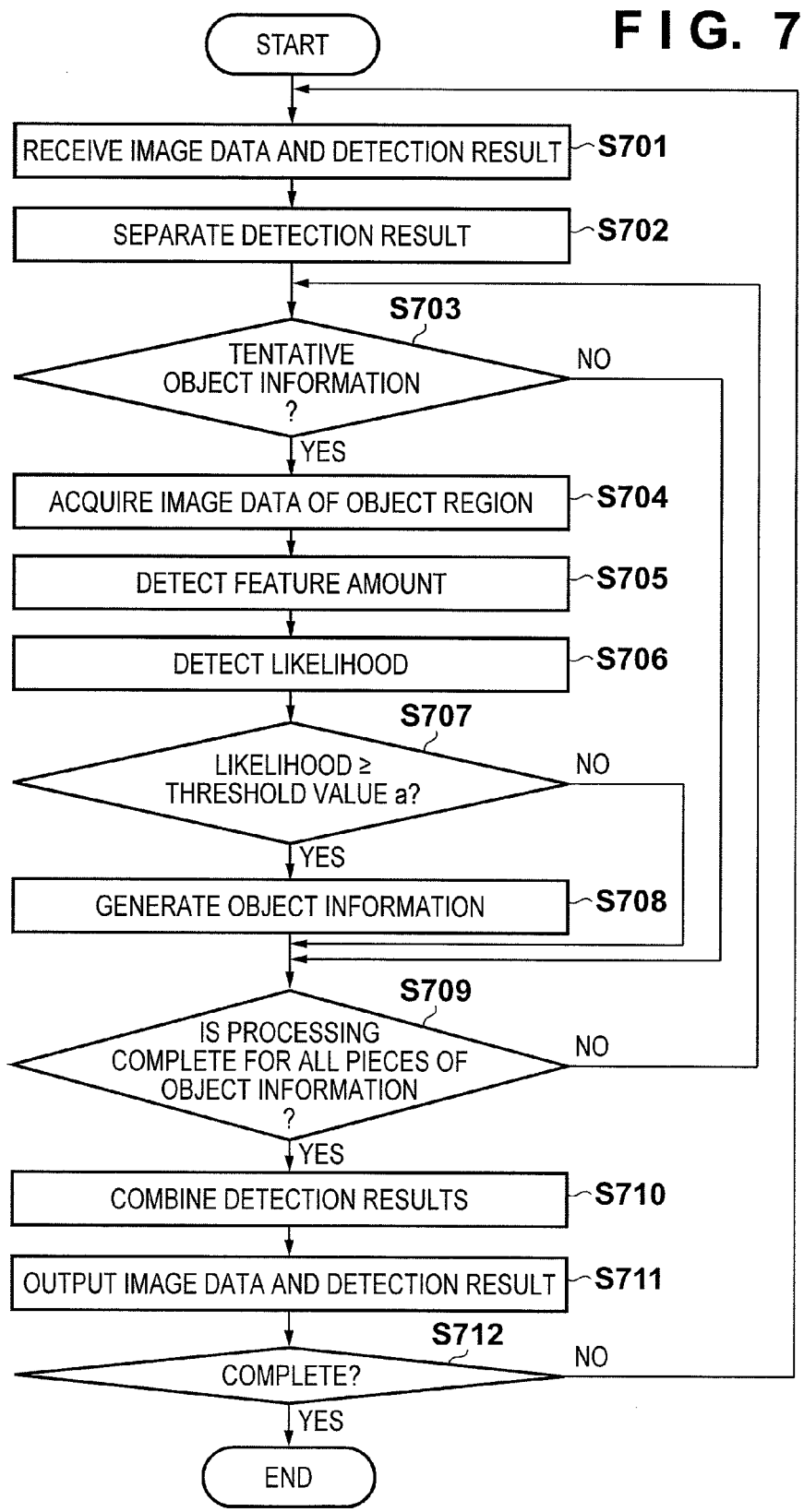
FIG. 7 is a flowchart illustrating a processing procedure of the image processing apparatus according to the second embodiment.

FIG. 7 is a flowchart illustrating a processing procedure of the image processing apparatus 103 according to the second embodiment. When the image processing apparatus 103 includes a processor and memory, the processing flow of FIG. 7 indicates a program for causing the processor to execute the procedure shown in FIG. 7. The processor of the image processing apparatus 103 serves as a computer, which executes a program read out from the memory of the image processing apparatus. The memory of the image processing apparatus 103 is a recording medium which records a program so that the processor can read out the program.

Referring to FIG. 7, in step S701, the image processing apparatus 103 receives image data and a detection result (integrated object information) from the network. In step S702, a detection data processing unit 603 performs separation processing for the integrated object information contained in the detection result. In the separation processing, the integrated object information is separated into specified object information and tentative object information. After the separation processing, the detection data processing unit 603 transmits the specified object information to the detection results combining unit 610, and transmits the tentative object information to the feature amount detection unit 605.

In step S703, the detection data processing unit 603 selects one piece of object information or one of a plurality of pieces of object information (specified object information or tentative object information) contained in the integrated object information, and determines whether the selected object information is tentative object information. If it is determined that the object information is not tentative object information (NO in step S703), the object information is specified object information and thus the detection data processing unit 603 transmits the object information to the detection results combining unit 610; otherwise (YES in step S703), the object information is tentative object information and thus the process advances to step S704.

In step S704, from the image data processing unit 602, the feature amount detection unit 605 acquires, from the received image data, image data (partial image data) corresponding to object region information (region data indicating an object position) contained in the tentative object information. In step S705, the feature amount detection unit 605 detects the feature amount of the acquired image data corresponding to the object region.

In the second embodiment, the image processing apparatus 103 acquires image data corresponding to an object region from the image data of a capture image. The present invention, however, is not limited to this. For example, the network camera may extract image data corresponding to an object region from a captured image, and then transmit object information containing the extracted image data.

FIG. 11B shows a data structure example of the object information in this case. When only the image data of an object region is transmitted and received, the network camera need not transmit the encoded image data of the whole captured image (all regions).

In step S706, the likelihood detection unit 606 compares the feature amount detected in step S705 with that in the recognition dictionary 607 to detect the likelihood of the object region. In step S707, the likelihood detected in step S706 is classified based on a first threshold value a. If it is determined that the likelihood is smaller than the first threshold value a (NO in step S707), it is determined that an object represented by the object information to be processed is not a human body, the object information is discarded, and then the process advances to step S709. Alternatively, if it is determined that the likelihood is greater than or equal to the first threshold value a (YES in step S707), the detection result generation unit 609 generates object information as human body object information (specified object information) in step S708.

In step S709, it is determined whether the processing is complete for all the pieces of object information contained in the integrated object information. If the processing is not complete (NO in step S709), the next object information to be processed is selected and the process returns to step S703 to determine whether the object information is specified object information or tentative object information. If the processing is complete (YES in step S709), the process advances to step S710.

In step S710, the detection results combining unit 610 combines a detection result (specified object information) obtained by detecting an object as a human body by the network camera 101 or 102 with a detection result (specified object information) obtained by detecting an object as a human body by the image processing apparatus 103. In step S711, an output control unit 309 outputs the image data and the thus obtained detection result. In step S712, it is determined whether the processing is complete for all the pieces of object information in the image received from each network camera. If the processing is incomplete (NO in step S712), the process returns to step S701 to process the next image; otherwise (YES in step S712), the process ends.

As described above, according to the second embodiment, a network camera detects the object region of a detected object, and transmits, as a detection result, image data and object information containing object region information together with specified object information to an image processing apparatus. Upon receiving the detection result containing the object information and the image data, the image processing apparatus executes object detection processing using the object information containing the object region information. This makes it possible to efficiently execute object detection processing with high accuracy in a system as a whole while reducing the processing load especially when the throughput of the network camera is low.

Other Embodiments

Aspects of the present invention can also be realized by a computer of a system or apparatus or devices such as a CPU or MPU that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251280, filed Nov. 9, 2010, which is hereby incorporated by reference herein in its entirety.

What is claimed is:

1. An image processing system in which an image capture apparatus and an image processing apparatus are connected to each other via a network, wherein the image capture apparatus is configured to:
  capture an image;
  detect a likelihood that a detection target object detected from the captured image is a predetermined type of object;
  generate, if the likelihood does not meet a designated criterion, tentative object information for the detection target object; and
  transmit the tentative object information to the image processing apparatus via the network; and
wherein the image processing apparatus is configured to:
  receive the tentative object information; and detect a detection target as the predetermined type of object from detection targets designated by the tentative object information.

2. The system according to claim 1, wherein, if the likelihood is greater than or equal to a second threshold value and is less than a first threshold value, the tentative object information is generated for the detection target object.

3. The system according to claim 1, wherein the image capture apparatus is further configured to:
    detect a feature amount of an object region of the detection target obtained from the captured image; and
    generate the tentative object information containing the feature amount of the object region of the detection target.

4. The system according to claim 3, wherein the tentative object information includes partial image data corresponding to the object region of the detection target, the likelihood of the object region of the detection target, or region data indicating a position of the object region of the detection target in the captured image.

5. An image processing system in which an image capture apparatus and an image processing apparatus are connected to each other via a network, wherein the image capture apparatus is configured to:
    capture an image;
    detect a likelihood that a detection target object detected from the captured image is a predetermined type of object;
    generate, if the likelihood meets a designated criterion, specified object information indicating that the detection target object has been specified as the predetermined type of object;
    generate, if the likelihood does not meet the designated criterion, tentative object information for the detection target object; and
    transmit, to the image processing apparatus via the network, integrated object information obtained by integrating the specified object information and the tentative object information each of which has been generated for the detection target object detected from the captured image; and
wherein the image processing apparatus is configured to:
    receive the integrated object information;
    detect a likelihood that a detection target specified by the tentative object information contained in the integrated object information is the predetermined type of object;
    generate, if the likelihood meets a designated criterion, specified object information indicating that the detection target object has been specified as the predetermined type of object;
    not generate, if the likelihood does not meet the designated criterion, object information for the detection target object; and
    output the specified object information contained in the integrated object information and the specified object information.

6. The system according to claim 5, wherein the tentative object information is generated for the detection target object if the likelihood is greater than or equal to a second threshold value and is less than a first threshold value; and
    wherein if the likelihood is not smaller than a third threshold value which is greater than the second threshold value and is less than or equal to the first threshold value, the specified object information is generated for an object region of the detection target, and if the likelihood is smaller than the third threshold value, the object information is not generated for the object region of the detection target.

7. The system according to claim 5, wherein a feature amount of the predetermined type of object stored in a recognition dictionary is compared with a feature amount of an object region of the detection target, and based on a comparison result, as an index for the object region of the detection target, a first index is generated indicating that the object is the predetermined type of object, a second index is generated indicating that whether the object is the predetermined type of object is uncertain, or a third index is generated indicating that the object is not the predetermined type of object; and
    wherein the specified object information or tentative object information which contains the index for the object region of the detection target is generated.

8. The system according to claim 5, wherein a likelihood is detected by comparing a feature amount of the predetermined type of object stored in a recognition dictionary with a feature amount of an object region of the detection target,
    wherein a first recognition dictionary used to detect the likelihood holds a feature amount of the predetermined type of object which is captured from a predetermined direction with respect to a reference plane of the predetermined type of object; and
    wherein a second recognition dictionary used to detect the likelihood holds a feature amount of the predetermined type of object which is captured from a plurality of different directions with respect to the reference plane of the predetermined type of object.

9. An image capture apparatus, comprising:
    a processor; and
    a memory including instructions that, when executed by the processor, cause the image capture apparatus to:
        detect a likelihood that a detection target object detected from a captured image is a predetermined type of object;
        generate, by considering, as a detection target, the detection target object whose likelihood does not meet a designated criterion, tentative object information to be used to cause an image processing apparatus to detect a detection target as the predetermined type of object from detection targets; and
        transmit the tentative object information to the image processing apparatus via a network.

10. The apparatus according to claim 9, wherein the instructions further cause the image capture apparatus to:
    generate, if the likelihood meets the designated criterion, specified object information indicating that the detection target object has been specified as the predetermined type of object, generate, if the likelihood does not meet the designated criterion, tentative object information for the detection target object; and
    transmit, to the image processing apparatus via the network, integrated object information obtained by integrating the specified object information and the tentative object information each of which has been generated for the detection target object detected from the captured image.

11. An image processing apparatus, comprising:
    a processor; and
    a memory including instructions that, when executed by the processor, cause the image processing apparatus to:
        receive specified object information indicating that a detection target object detected from a captured image has been specified as a predetermined type of object, and tentative object information for the detection target object whose likelihood that the detection target object is the predetermined type of object does not meet a designated criterion;

detect a likelihood that a detection target designated by the tentative object information is the predetermined type of object;

generate, if the likelihood meets the designated criterion, specified object information indicating that the detection target object has been specified as the predetermined type of object; and output the specified object information contained in integrated object information and the generated specified object information.

12. A control method for an image capture apparatus, comprising:

detecting a likelihood that a detection target object detected from a captured image is a predetermined type of object;

generating, by considering, as a detection target, the detection target object whose likelihood does not meet a designated criterion, tentative object information to be used to cause an image processing apparatus to detect a detection target as the predetermined type of object from detection targets; and transmitting the tentative object information to the image processing apparatus via a network.

13. The method according to claim 12, wherein if the likelihood meets the designated criterion, specified object information indicating that the detection target object has been specified as the predetermined type of object is generated, and if the likelihood does not meet the designated criterion, tentative object information for the detection target object is generated; and wherein integrated object information obtained by integrating the specified object information and the tentative object information each of which has been generated for the detection target object detected from the captured image is transmitted to the image processing apparatus via the network.

14. A control method for an image processing apparatus, comprising:

receiving integrated object information obtained by integrating specified object information indicating that a detection target object detected from a captured image has been specified as a predetermined type of object, and tentative object information for the detection target object whose likelihood that the detection target object is the predetermined type of object does not meet a designated criterion;

detecting a likelihood that a detection target designated by the tentative object information contained in the integrated object information is the predetermined type of object;

generating, if the likelihood meets a designated criterion, specified object information indicating that the detection target object has been specified as the predetermined type of object; and outputting the specified object information contained in the integrated object information and the generated specified object information.

15. A non-transitory computer-readable storage medium storing a program for causing a computer to execute:

detecting a likelihood that a detection target object detected from a captured image is a predetermined type of object;

generating, by considering, as a detection target, the detection target object whose likelihood does not meet a designated criterion, tentative object information to be used to cause an image processing apparatus to detect a detection target as the predetermined type of object from detection targets; and transmitting the tentative object information to the image processing apparatus via a network.

16. The storage medium according to claim 15, wherein if the likelihood meets the designated criterion, specified object information indicating that the detection target object has been specified as the predetermined type of object is generated, and if the likelihood does not meet the designated criterion, tentative object information for the detection target object is generated; and wherein integrated object information obtained by integrating the specified object information and the tentative object information each of which has been generated for the detection target object detected from the captured image is transmitted to the image processing apparatus via the network.

17. A non-transitory computer-readable storage medium storing a program for causing a computer to execute:

receiving integrated object information obtained by integrating specified object information indicating that a detection target object detected from a captured image has been specified as a predetermined type of object, and tentative object information for the detection target object whose likelihood that the detection target object is the predetermined type of object does not meet a designated criterion;

detecting a likelihood that a detection target designated by the tentative object information contained in the integrated object information is the predetermined type of object;

generating, if the likelihood meets a designated criterion, specified object information indicating that the detection target object has been specified as the predetermined type of object; and outputting the specified object information contained in the integrated object information and the generated specified object information.

* * * * *